United States Patent [19]
Akatsuka et al.

[11] 3,985,845
[45] Oct. 12, 1976

[54] METHOD FOR CONTROLLING THE GAP BETWEEN LIPS OF A DIE FOR EXTRUDING A PLASTIC SHEET MATERIAL

[75] Inventors: Takeaki Akatsuka; Katsuichi Kitagawa; Hiroyoshi Amo; Osamu Mita, all of Otsu, Japan

[73] Assignee: Toray Industries, Inc., Tokyo, Japan

[22] Filed: May 31, 1974

[21] Appl. No.: 474,946

[30] Foreign Application Priority Data
June 12, 1973   Japan.............................. 48-65376

[52] U.S. Cl. ........................ 264/40.5; 264/176 R; 425/141; 425/466
[51] Int. Cl.² ........................................ B29D 7/02
[58] Field of Search............ 264/40, 176 R; 425/141, 425/466

[56] References Cited
UNITED STATES PATENTS
| | | | |
|---|---|---|---|
| 2,938,231 | 5/1960 | Lowey, Jr. ........................... | 425/466 |
| 3,694,119 | 9/1972 | Scheibling........................... | 264/171 |
| 3,782,873 | 1/1974 | Lynnknowles...................... | 425/466 |

FOREIGN PATENTS OR APPLICATIONS
| | | | |
|---|---|---|---|
| 1,504,374 | 9/1969 | Germany.............................. | 264/40 |

OTHER PUBLICATIONS
Peter Fischer, *Messen–Regeln–Stevern*, Kunstoff–Technik, Fall 1971, pp. 79–80.
*System Described for Automating Extruder Die Adjustment*, Plastics Technology, May 1964.

*Primary Examiner*—Robert F. White
*Assistant Examiner*—T. E. Balhoff

[57] ABSTRACT

A method and an apparatus for adjusting the gap between lips of a die for extruding a plastic sheet material. A pair of flat plates spaced from each other have a plurality of bolts for controlling the gap. The operational adjustment of each bolt is generated as an electric signal, and this electric signal is added with reference to all the bolts to distribute the gaps between the die lips. Each adjustment is changed so that the distribution of the gap between the die lips acquires a predetermined form to thereby determine the necessary amount of adjustment of each bolt.

6 Claims, 11 Drawing Figures

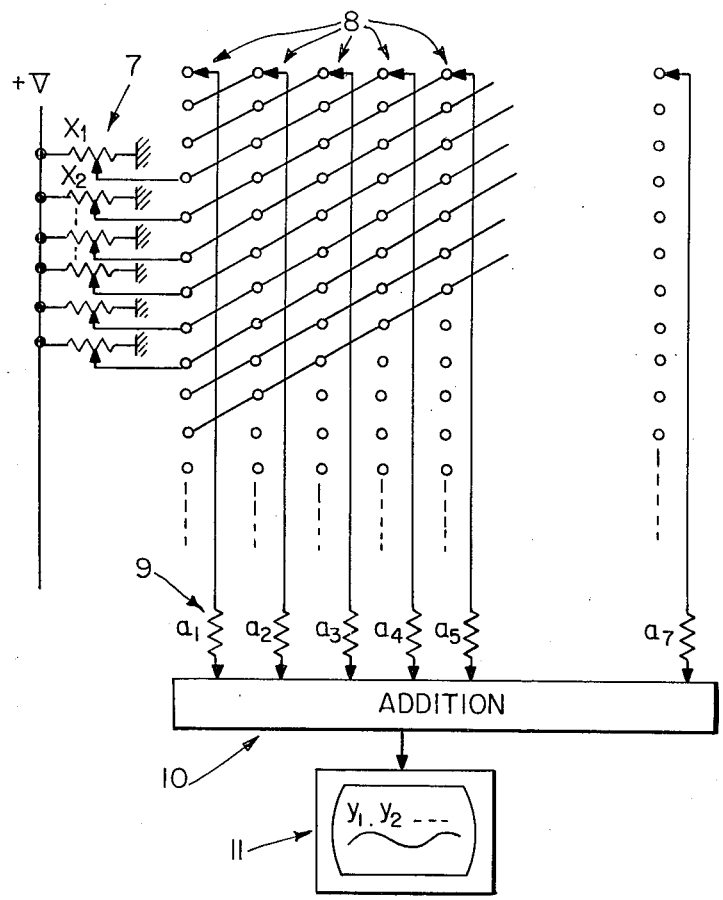
_Fig. 4_
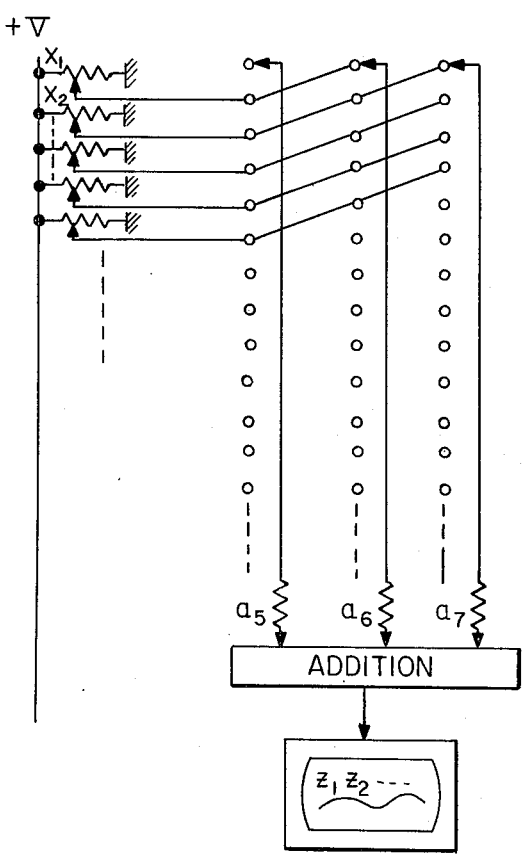
_Fig. 5_

METHOD FOR CONTROLLING THE GAP BETWEEN LIPS OF A DIE FOR EXTRUDING A PLASTIC SHEET MATERIAL

BACKGROUND OF THE INVENTION

The present invention relates to a method and apparatus for controlling the gaps between lips of a die for extruding a molten plastic in an apparatus for producing a plastic sheet-like material such as, for example, a plastic film.

More in particular, the invention relates to a method and an apparatus for operating the die adjusting bolts while taking into account the interaction between separate adjustments that are individually made.

Normally, in an apparatus for producing a plastic sheet-like material such as a plastic film, as shown in FIGS. 1a and b a die having a plurality of bolts 1 for controlling the gap between the lips is used. A molten plastic is introduced into the die through an inlet 2 by a pump (not shown), and is extruded through a gap between a pair of die lips 3, and is solidified to form a sheet-like material. The thickness of the so-produced plastic sheet is greatly influenced by the gap between these die lips 3. Especially, the distribution or pattern of thickness in a transverse direction on the sheet may be said to be determined by the distribution of the gap between die lips, across the die.

Accordingly, the distribution of thickness of a plastic sheet-like material is controlled by finely adjusting this distribution of the gap between the die lips, by means of adjusting bolts. The distribution of the gap between die lips is controlled by rotating the adjusting bolts 1 and selectively pressing or pulling the lips 3 together or apart. However, because the nozzle lips 3 are made in one piece, and are made of metal, when one bolt is moved, the gap between the die lips changes extensively in other positions as shown in FIG. 2, the gap between the die lips at the positions of other bolts being influenced by the adjustment. Because of this interaction, it is very difficult to adjust the lips 3 to bring about the desired gap distribution, and adjustments for controlling the gap between the die lips are at present carried out on a trial-and-error basis and depend upon the experience of a skilled worker, requiring a very long period of time. Especially, when these operations are carried out while the products are being produced, the percentage of products coming up to the standard of quality is reduced greatly, due to the unevenness of thickness of the product across its width.

SUMMARY OF THE INVENTION

An object of the present invention is to provide a method and means for quickly and accurately controlling the gap between the die lips, and for precisely guiding these operations.

Another object of the present invention is to provide means for controlling a die adjustment by taking into account, upon manipulating each bolt for controlling a nozzle, the influence it exerts upon positions of other bolts and the displacement it receives from the adjustment of other bolts.

Still another object of the present invention is to provide a method for controlling positions of adjusting bolts while taking into account the characteristics of the bolts.

Other objects of the present invention will become apparent from the following description.

The method of the present invention comprises controlling the gap between the lips of a die for extruding a plastic sheet-like material formed through a pair of flat plates opposite to each other by a plurality of adjusting bolts, characterized by making electric signals for each bolt position which correspond with the variations of the gap between the die lips at the position of each bolt, including the effects attributable to neighboring bolts, adding these signals with reference to each bolts to thereby determine the variation of the gap between the die lips at the position of said bolt, adjusting this distribution of gap between the die lips so that it takes the desired form, and effecting the resulting adjustment of each bolt.

BRIEF DESCRIPTION OF THE DRAWINGS

Of the drawings:

FIG. 1b is an end view of a sheet extruding die of the type illustrated in FIG. 1a.

FIG. 4 is a schematic view showing one example of an electric signal generating circuit used in the present invention.

FIG. 5 is a schematic view showing one example of the circuit for setting up the thickness of a sheet-like material when a flat distribution of the gap is to be made.

DETAILED DESCRIPTION OF THE INVENTION

Figure 1A:
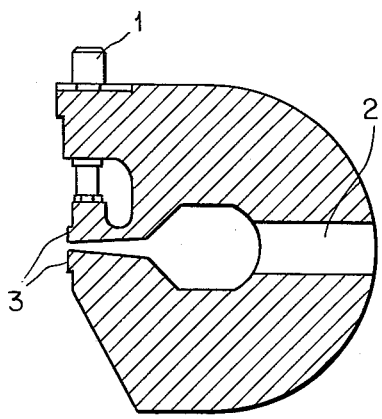
FIG. 1a is a sectional view taken through a sheet extruding die embodying features of this invention, taken as indicated by the lines and arrows 1a — 1a which appear in FIG. 1b.

As shown in FIGS. 1a and b, the nozzle lips 3 are made in one piece. Accordingly, when one bolt is adjusted, by an operational increment (a), the gap between die lips changes in a pattern like the solid line 4 in FIG. 2. Such phenomenon reoccurs in the successive adjustments of each bolt. The adjustment of each bolt also effects is neighbors. Accordingly, when another bolt is controlled after controlling a first bolt, the gap between the die lips at the position of the first bolt changes from the value set up at first.

Because of this, in order to obtain a desired distribution of the gap between nozzle lips, (for example, a uniform gap or a gap having a specified variation), it is preferable to carry out control, upon adjusting any given bolt, by taking into account the amount of change to be imparted to the control action of another bolt, or the amount of change to be imparted to the gap between the die lips at the position of another bolt so that the desired gap between the lips may be obtained quickly. It is also desirable automatically to indicate this operation and to complete the adjustment within a short period of time.

The present invention achieves this object by using electronic circuits.

Figure 2:
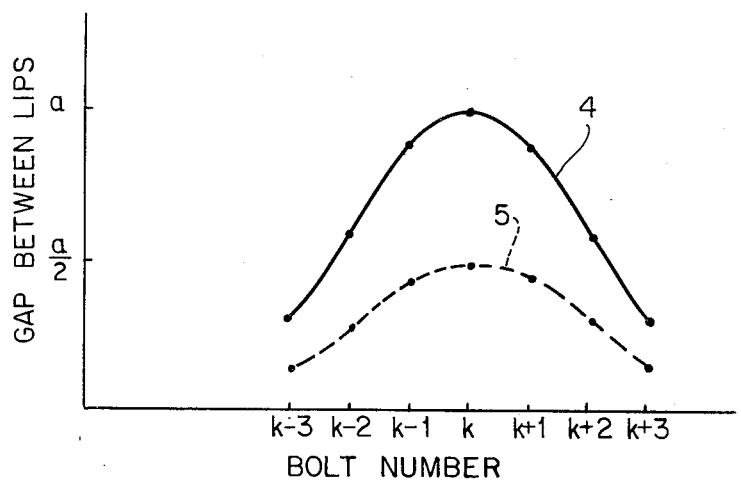
FIG. 2 is a schematic view showing a gap between lips of a nozzle when one bolt is operated.
Figure 1B:
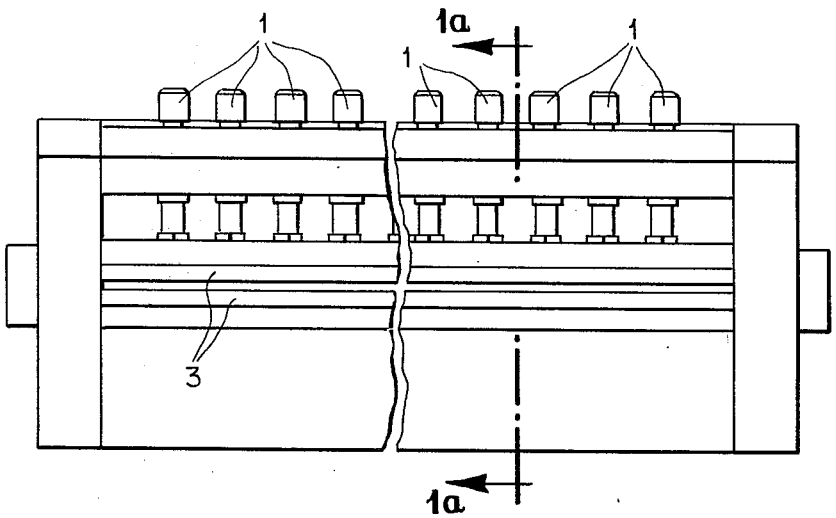

In the present invention, electronic conversion circuits, constituting a simulator, are provided to generate a gap width pattern between die lips brought about by displacement of one bolt such as, for example, the pattern shown in FIG. 2. The number of such electronic circuits is the same as the number of adjusting bolts. This pattern depends on the material and design of the die, among other variables. This pattern expresses the variation of the gap between the die lips at the position of the same bolt and bolts in its vicinity, as created by any adjusting operation of any individual bolt.

In the present invention, by an electronic circuit, the amount of adjustment corresponding to the adjustment imparted to one bolt is converted as an electric signal corresponding to the actual change of the gap between the nozzle lips, for example, in a pattern such as that represented by the solid line 4 in FIG. 2. As the actual variations of the gap change proportionally to the amount of adjustment of one bolt, in the present invention also, the electric output signal showing the distribution of gaps between nozzle lips increases or decreases proportionally by the same pattern corresponding to the change of an electric input signal which corresponds to the amount of adjustment of a bolt. In FIG. 2, the dotted line 5 shows the pattern obtained when half of the required adjustment which would give a pattern of the solid line 4, is to a bolt.

Figure 3:
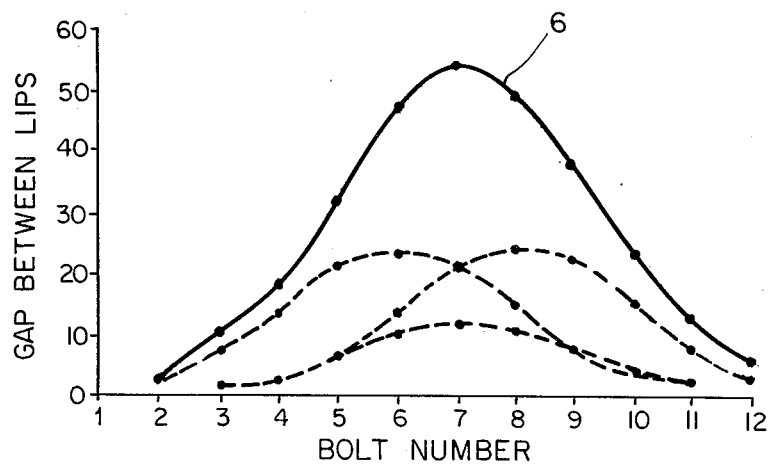
FIG. 3 is a schematic view showing a gap between lips of nozzles when three bolts are operated.

Next, the case of adjusting a plurality of bolts will be considered. FIG. 3 shows an example in which three bolts are adjusted. When the 6th, 7th and 8th bolts (k=6, k=7 and k=8) are so rotated as to move the 6th bolt by 23 microns, the 7th bolt by 12 microns and the 8th bolt by 23 microns, the distribution of the gap between the die lips at the 12 positions of the 1st through 12th bolt takes the form of the solid line 6 in FIG. 3.

When a plurality of bolts are adjusted, the displacement of the gaps between the die lips varies by an amount obtained by adding up the displacements caused by the adjustments of the respective bolts.

This is because the amount of displacement caused by a bolt and the load contributed by the bolt are linearly related so long as the deformation of the bolt is within the elastic limit.

Accordingly, when the gap between the die lips is uniform and the adjustment is imparted to each bolt, the gap between the die lips becomes like the solid line 6 appearing in FIG. 3.

In the present invention also, by adding the electric signals showing the pattern of variation of the gap, an electric signal of a pattern of distribution of the gap, when a plurality of bolts are adjusted, is obtained.

One example of the electric circuit used in the present invention is shown in FIG. 4.

In this circuit, electric signals corresponding to the increments of adjustment $x_1', x_2 \ldots x_k$ of the respective bolts are generated by variable resistors that are regulators. The number of the regulating resistors is the same as the number of the bolts. These variable resistors or potentiometers, as shown in FIG. 4, are connected by wiring to a terminal board or simulator. In FIG. 4, the number 8 designates switching points of contacts that are interlocked with each other, which points are connected to fixed resistors 9 used as weights for creating a pattern showing the distribution of the gap between the die lips. Each pattern thus created is added up by an integrator 10 and the output of the added patterns is indicated on an indicator 11. In this example, consideration is given to the influence exerted upon three bolts on both left and right hands, counting from the bolt adjusted. And it is assumed that the patterns formed are the same with reference to each bolt. The actual deformations of the die lips are not entirely the same with respect to each bolt, especially at both terminals. However, the difference is very slight. Accordingly, no obstacle is encountered in actual use. When the switch points of contact 8 are all transferred successively, electric signals corresponding with the gaps between the die lips at the position of each bolt, to which is added a factor representing the influence exerted by the bolts in the vicinity, are successively generated. Accordingly, when the switch points of a contact are switched over at high speed and the output is displayed on a cathode ray tube which is the indicating device 11, the variation of the gap between the die lips at the position of each bolt, due to the displacements of the bolts, is indicated as the same number of points.

When operations are carried out using such an apparatus, the respective variable resistors are manually adjusted so that the output of the indicating device 11 coincides with a given distribution of gap between die lips, or a given distribution of thickness of the plastic sheet, measured in advance. The amount of adjustment (rotation angle) of each of the rotatable potentiometer variable resistors 7 at this time corresponds to the necessary rotation angles of the bolts for obtaining the required gap distribution between die lips or distribution of thickness of the sheet-like material extruded therethrough.

In order to provide a flat distribution, (uniform thickness sheet), the respective bolts are rotated in the opposite or reverse direction in an amount corresponding to this thus determined rotation angle. This is important when it is desired to eliminate variation of distribution of thickness or to provide a uniform distribution thickness of the product as determined by the width of the die lip.

In actual operation, in the relation of the rotation angle of the bolts to the variation of the gap between die lips and distribution of thickness of the sheet-like material, errors are brought about by play in the bolts, and by other conditions. Accordingly a more precise control may be carried out when the bolts are adjusted while measuring not only the rotation angle, but also measuring the variation of the actual gap between nozzle lips, and variation of thickness of the sheet-like material.

Hereinbelow, an explanation will be made with reference to adjusting bolts while measuring not the angle of rotation, but the gap distribution between the die lips or the distribution of thickness of the resulting film, using a thickness measuring means such as radioactive rays or ultraviolet rays, for example.

When the bolts are adjusted by this method, it is usually desirable to adjust them successively, starting from either the left or right end of the die.

As one example, the procedure for measuring distribution while adjusting the bolts from the left end will be considered. In this case, it will be assumed that a flat distribution (uniform sheet thickness) is desired.

Using the apparatus shown in FIG. 4, variable resistors 7 corresponding to their respective bolts are operated so that the reading (indication) of an indicator coincides with a given distribution of thickness. The bolts may be successively rotated in an opposite direction by amounts corresponding to the angles of rotation of the respective variable resistors 7. However, in order to avoid errors due to play in the bolts and so forth, it is desired to regulate these adjustments by reference to the thickness of the film instead of said angle of rotation, and to rotate the bolts until the thickness of the film reaches a predetermined value at each point. The amount of adjustment of the left-most bolt may be controlled subject to allowances for the subsequent adjustment of the neighboring bolts. In the apparatus shown in FIG. 4, the gap between nozzle lips (thickness of the film) at the position of the left-most bolt is expressed by the following equation:

$$y_1 = a_4 x_1 + a_5 x_2 + a_6 x_3 + a_7 x_4 \quad (1)$$

wherein $x_1$, $x_2$, $x_3$ and $x_4$ are distances set up by variable resistors 7 and $y_1$ is the amount obtained by adding each of these distances multiplied by the respective weights of the fixed resistors 9.

Actually, $y_1$ is the distance corresponding to the thickness or gap at the position of the first bolt, and $x_1$, $x_2$, $x_3$ and $x_4$ are values corresponding to the angles of rotation of the first, second, third and fourth bolt, while $a_4$, $a_5$, $a_6$ and $a_7$ are weight coefficients relating to the influence exerted by said first, second, third and fourth bolt upon the gap at the position of the first bolt.

In equation (1), $a_4 x_1$ is a measure of the influence exerted by operation of the left-most bolt upon the gap between the die lips at its own position, while the terms from $a_5 x_2$, $a_6 x_3$ and $a_7 x_4$ show the influences exerted by adjustment of the successive bolts upon the gap between the die lips at the position of the first bolt. Now, when adjustment is carried out at the first bolt, adjustment by the amount $a_4 x_1$ is sufficient. Terms from $a_5 x_2$ and onward are amounts for adjustment of the second bolt, third bolt, etc. Accordingly, when the gaps between the die lips or thicknesses of a film at different points along its width are desired to be uniform, the necessary amount of adjustment of the first bolt is a rotation in the amount $x_1$ relative to the zero position, which, when expressed as the gap between nozzle lips (or thickness of film) means that the first bolt is so adjusted that the gap between nozzle lips (or thickness of the film) will be equal to the amount obtained by deducting $a_4 x_1$ from the position $y_1$, namely, the position $z_1$, expressed by $$z_1 = y_1 - a_4 x_1 = a_5 x_2 + a_6 x_3 + a_7 x_4 \quad (2)$$

In general, the gap between the die lips or thickness of a film at the position of No. $k$ bolt is expressed by the equation:

$$y_k = a_1 x_{k-3} + a_2 x_{k-2} + a_3 x_{k-1} + a_4 x_k + a_5 x_{k+1} + a_6 x_{k+2} + a_7 x_{k+3} \quad (3)$$

wherein the designations of the variables are the same as mentioned above and wherein $k-3$ designates the bolt three to the left of bolt $k$ and $k+3$ designates the bolt three to the right of bolt $k$. Similar meanings are applicable to bolts $k-2$, $k-1$, $k+1$ and $k+2$.

Now, when it is assumed that the operation of the bolts is carried out from the first bolt through bolt $(k-1)$, the amounts of adjustment of bolts $(k-3)$, $(k-2)$ and $(k-1)$ (namely, $x_{k-3}$, $x_{k-2}$ and $x_{k-1}$) in equation (3) are made zero. Therefore, the gap between the die lips (thickness of film) at that time becomes $$w_k = a_4 x_k + a_5 x_{k+1} + a_6 x_{k+2} + a_7 x_{k+3}$$

Accordingly, bolt $k$ should be rotated by $x_k$ to the zero position and the terms from $x_{k-1}$ and onward become zero by adjustment of bolt $(k-1)$ and $a_7 x_4$. In general, operation of bolt $(k)$ may be carried out so that the gap between the die lips or thickness of film becomes:

$$z_k = w_k - a_4 x_k = a_5 x_{k+1} + a_6 x_{k+2} + a_7 x_{k+3} \quad (4)$$

This $z_k$ may be obtained from, for example, a circuit of the type shown in FIG. 5. The action of this circuit is the same as that in FIG. 4. As will be apparent from equation (4), the first half terms in equation (3), i.e., $x_{k-3}$, $x_{k-2}$, $x_{k-1}$ and $x_k$ are all zero. Therefore, they are not connected to $a_1$, $a_2$, $a_3$ and $a_4$. Namely, only the right half of the pattern in FIG. 2 is brought about.

Using values of $z_1$, $z_2$, $z_3$ ... given by the circuit shown in FIG. 5, the first bolt is so adjusted that the gap between the die lips or thickness of the film is $z_1$. Then, the second bolt is so operated that the gap between the die lips or thickness of film at this position is $z_2$. At this time, the gap between the die lips at the first position is moved further from $z_1$ in the direction of becoming flat by the influence of the adjustment of the second bolt. Accordingly, when the bolts are so adjusted that the thickness of the film or the gap between nozzle lips becomes successively $z_1$, $z_2$, $z_3$ ... $z_k$ as given in the circuit of FIG. 5, it is possible easily to provide a flat distribution of thicknesses or distribution of gaps between nozzle lips and to eliminate unevenness of the thickness of the film as a result.

As a next example, a case in which it is desired to provide a predetermined distribution of thicknesses will be considered.

Because the terms from $a_5 x_2$, $a_6 x_3$ and onward in equation (1) are amounts controlled by adjustment of the second bolt, a third bolt and onward, the left-most bolt may be set at $t_1$ according to the equation $$t_1 = a_4 x_1$$

In general, in the case of bolt $(k)$, this bolt may be set at $t_k$ which represents any bolt located at any position $k$ and is determined from the following equation:

$$t_k = a_1 x_{k-3} + a_2 x_{k-2} + a_3 x_{k-1} + a_4 x_k \quad (5)$$

Figure 6:
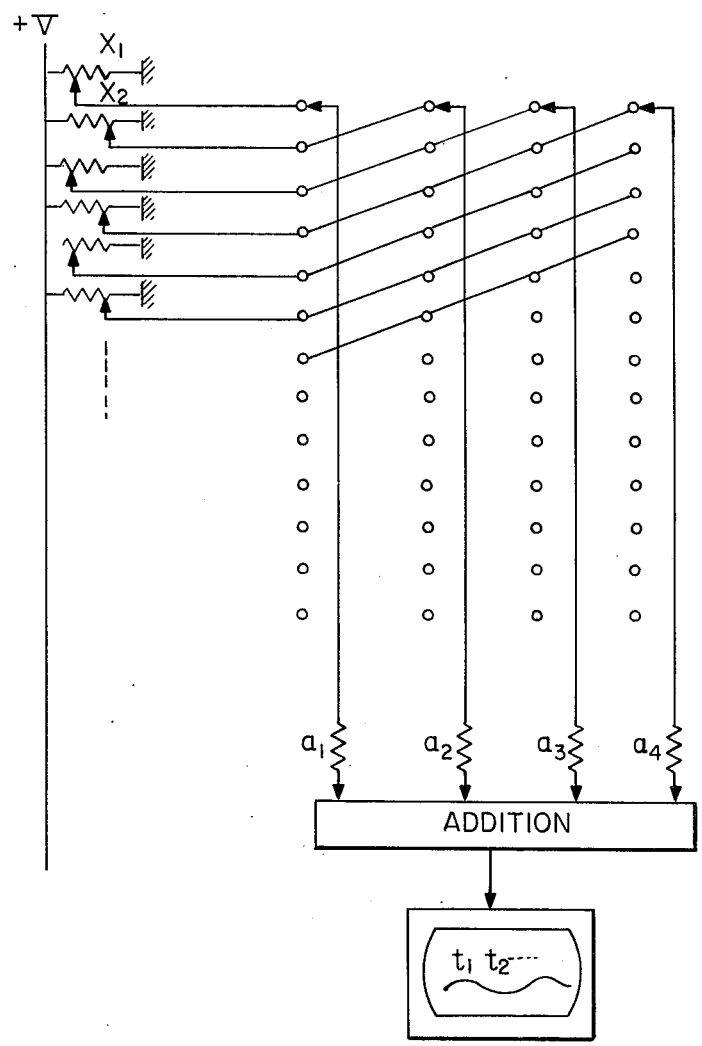
FIG. 6 is a schematic view showing one example of the circuit for setting up the thickness of a sheet-like material when some distribution of thickness is to be made.

These signals are obtained by the circuit shown in FIG. 6, in which the switching points of the contacts are successively switched over. Therefore, when the thickness of the film or the gap between the die lips is successively adjusted by the bolt control, the predetermined distribution of thickness is finally obtained. As will be apparent from equation (5), this brings about only the left half pattern of FIG. 2. The circuits of FIGS. 4, 5 and 6 are the same in action and function, and both circuits of FIGS. 5 and 6 differ from the circuit of FIG. 4 only in the method of connecting the weight resistors. Accordingly, it is possible to set up the circuits by adding change-over switches to the circuit of FIG. 4.

When the bolts are adjusted from the right hand end of the die, the opposite half circuits are used.

Figure 7:
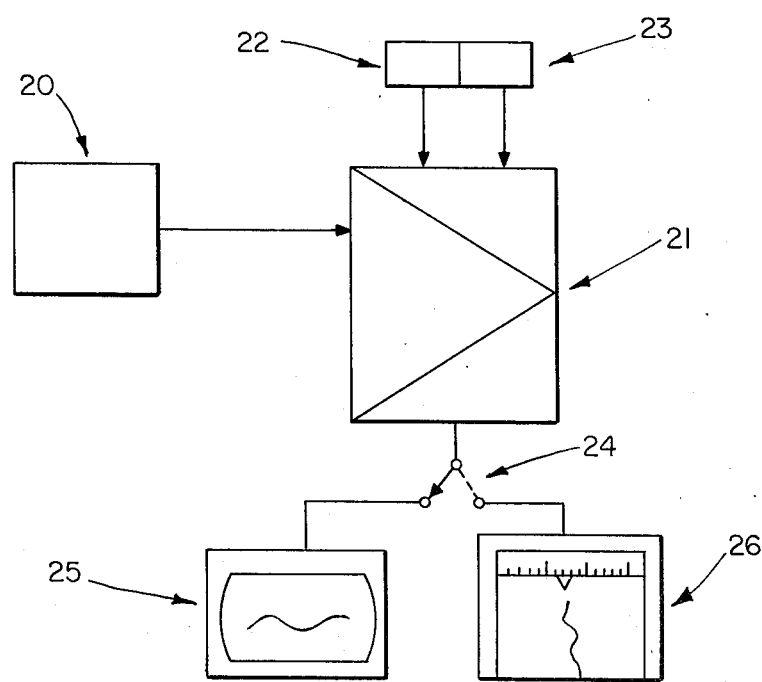
FIG. 7 is a schematic view of an entire structure embodying features of the present invention.

FIG. 7 shows a block diagram of an entire structure of an apparatus of the present invention. In FIG. 7, the number 20 designates a circuit for generating sham (simulated) signals corresponding to the operational amounts of rotation of the adjusting bolt. The number 21 designates a row of switching points of a contact and wiring board. The number 22 designates a switch for producing the values of the equation (4), 23 is a switch for producing the values of the equation (5), 25 is a cathode ray tube indicating these values, 26 is a recorder and 24 is a change-over switch therefor.

In the foregoing method, the bolts have been adjusted while using the film thickness as a guide. Hereinbelow, a method of adjusting bolts will be explained in which degrees of rotation of the bolts are obtained from the operation of variable resistors 7 while taking into account the characteristics of the bolts.

A phenomenon frequently takes place in which the expected variation of the gap between the die lips is not in accord with the actually controlled variation of the gap.

Figure 8:
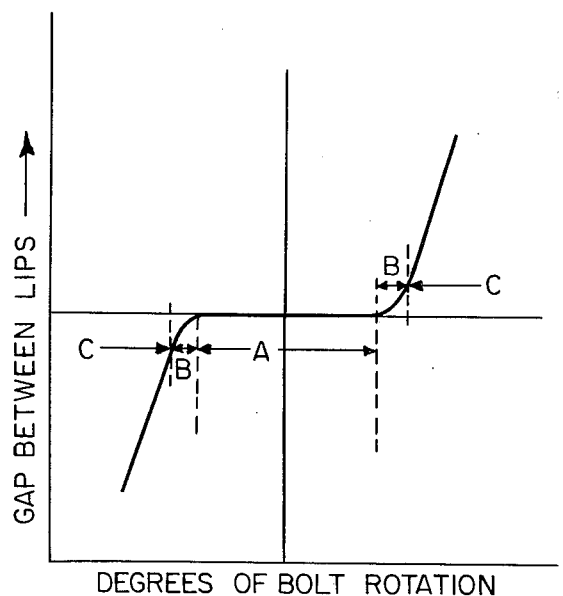
FIG. 8 is a graph showing the relationship between the amount of bolt rotation and the variation of gap between lips of a die imparted thereby.

This phenomenon is caused neither by the system nor by the adjusting device, but due to the nature of the bolts per se. It has been found that the degree of rotation of a bolt and the variation of the gap between nozzle lips are not directly linearly related, due to "play" of the adjusting bolts. As shown in FIG. 8, in the relation which consists of a zone A (dead zone) in which the gap between the die lips hardly changes at all when the bolt is rotated, and zone B (non-linear zone) in which the angle of rotation of the bolt and the variation of the gap between the die lips are in a non-linear relation, and zone C (linear zone) in which the angle of rotation of the bolt and the variation of the gap between the die lips are in a linear relation.

Accordingly, upon rotating the adjusting bolt, when the rotated bolt enters a dead zone, the gap between the die lips hardly changes at all when the bolt is rotated in said zone, and for that reason precise control of the gap between the die lips cannot be achieved.

Accordingly, when adjustment of bolts is carried out by rotating the bolts by the necessary amount minus the amount of rotation of the bolts in the non-sensing zone, this makes it possible to adjust the bolts precisely.

This method is applicable to seeking and indicating the degrees of rotation of the bolts for controlling the gap between the die lips, based on a measured distribution pattern of thickness across the film, and manually rotating the bolts in accordance with the indicated value. It is also applicable to obtaining the output of the signal for determining the amount of rotation of the bolts under control of electric signals and thereby automatically rotating the bolts to control the gap between the die lips.

Figure 10:
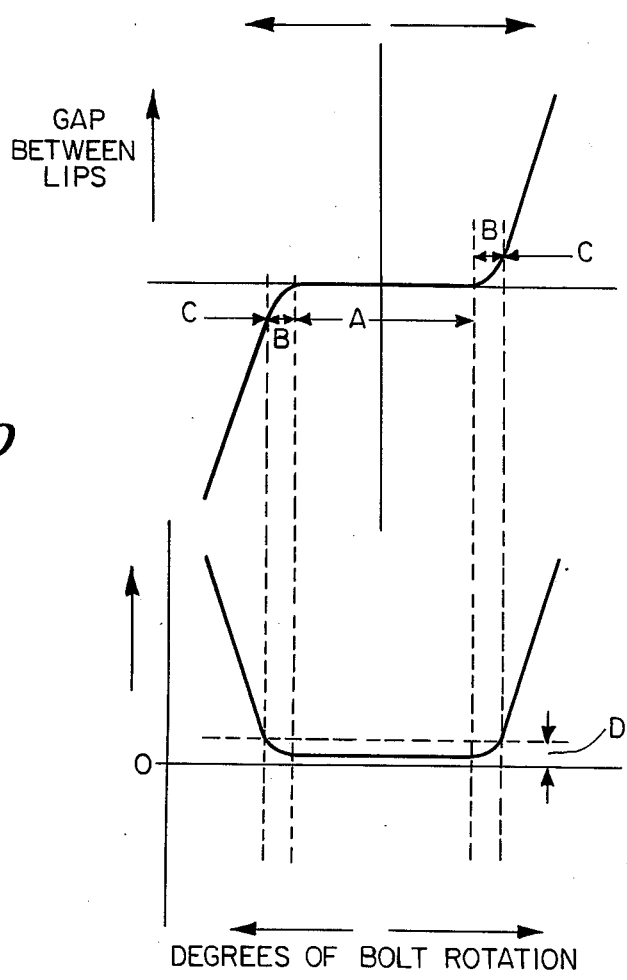
FIG. 10 is a graph showing the correlation among the amount of rotation of a bolt, variation of gap between lips of a die, and rotation torque of a bolt.

The dead zones of the bolts can be detected by detecting the torque of the bolts upon rotation. There is a definite relationship between these, as shown in FIG. 10, which will be discussed in detail hereinafter.

Figure 9:
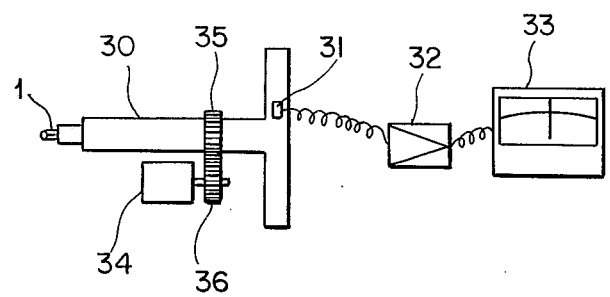
FIG. 9 is a schematic view showing one example of a method for detecting the amount of rotation and the rotation torque of an adjusting bolt.

Upon carrying out actual control, it is possible to operate the bolts while detecting their rotation torque by using an apparatus as shown in FIG. 9. In FIG. 9, 1 is an adjusting bolt, 30 is a bolt rotating jig for rotating the bolt 1, 31 is a strain gauge incorporated in the jig 30, 32 is an amplifier for amplifying the rotation torque signal from the strain gauge, 33 is a torque meter, and 34 is a detector for detecting the degree of rotation of the bolt which is rotated interlockingly by rotation of the jig 30 via a gear 36 engaged with a gear 35 fixed on the jig 30.

Operation of the bolt for control 1 is carried out by rotating the jig 30 while detecting the amount of rotation by the detector for detecting the amount of rotation 34. At the same time, the rotation torque of the bolt 1 is detected by the strain gauge 31 and indicated on the torque meter 33. The rotation torque of the bolt 1 varies depending upon whether the applicable zone is the dead zone A, the non-linear zone B or linear zone C of the bolt.

Accordingly, while the bolt 1 is being rotated, when said bolt enters the dead zone, the rotation torque indicated on the torque meter becomes less than a certain value. When the bolt 1 is further rotated, passing to the linear zone, the rotation torque becomes more than a certain value. This is illustrated as shown in FIG. 10, and the rotation torque varies in accordance with the varied amount of the gap between the die lips. In FIG. 10, D is a dead zone.

In this method, the bolt is rotated through the necessary angle without counting the rotation in the dead zone, in determining the necessary amount of rotation of the bolt. Accordingly, it is possible to rotate the bolt 1 while observing the indicated value of the torque meter 33 and to operate the tool 30 until the amount of rotation becomes equal to said counted necessary amount of rotation of the bolt, plus the amount of rotation of the bolt indicated by the detector of rotation during the period in which the rotation torque of said bolt is less than a predetermined threshold value.

Further, the strain gauge 31 and the detector 34 may be electrically connected via a relay. Whenever the rotation torque of the bolt becomes less than the threshold value, the detector 34 is adapted to be turned off so that the amount of rotation within the dead zone will not be detected by the detector 34.

As will be apparent from such structure, the actual amount of rotation of a bolt which has passed through a dead zone is obtained by adding the amount of rotation of the bolt for control in the dead zone to the necessary amount of rotation of said bolt.

Thus, the bolts are successively rotated to control the gap between the die lips.

In controlling the gap between the die lips in the aforesaid example, the bolts are rotated without considering the non-linear zone. This is because the non-linear zone of a bolt is normally a very small zone which is negligible as a source of error. However, when the non-linear zone of a bolt is too large to be neglected from the viewpoint of precision, the control may be modified by the necessary amount of rotation of the bolt in the non-linear zone. This amendment may be referred to as $1 \times k$.

This method has the ability to eliminate the unevenness of control of the gap between the die lips due to the dead zone as mentioned above, making it possible precisely to control the gap between the die lips.

As mentioned so far, according to the present invention, the amount of adjustment of a bolt at the time of controlling the gap between the die lips is indicated by an electric circuit. Accordingly, upon adjusting the bolts, a one-time control suffices for each bolt, and it is possible drastically to shorten the required control time. Since about 40 – 60 adjusting bolts are normally provided on an actual die, the quick adjustment made possible by the method of the present invention is very useful.

What we claim is:

1. A method for controlling the gap between the lips of a die for extruding a plastic sheet-like material, said die including a pair of flat plates opposite to and spaced from each other and having a plurality of spaced-apart adjusting bolts at spaced points along the width of the gap, each bolt being deformed within its elastic limit, and wherein a simulator is connected electrically to provide a plurality of electrical signals each corresponding to the turning of a corresponding adjusting bolt, the steps which comprise:
   1. simulating displacement of the gap between lips of the die at the location of each of the adjusting bolts while taking into account the interaction between separate bolt adjustments that are individually made, by conversion means associated with each adjusting bolt to produce electric signals corresponding to the angular turning movement of each adjusting bolt, in which said electric signals have the form $x_k$, where $n$ is the number of bolts, and where $k$ is the bolt number starting sequentially from the one end and progressing to the other, and wherein said signals $x_k$ correspond to operational amounts of rotation of each bolt, and wherein said signals generate electric signals corresponding to $a_1x_k, a_2x_k, - - - a_ex_k$ for the respective bolts, which signals simulate the gap displacement due to adjustment of the bolt having each $k$ number by multiplying effective coefficients $a_1, a_2 - - - a_e$ to $x_k$ considering the effect on the gap distribution which is obtained by rotating the bolt which has that $k$ number, where each $a$ designates a weighing resistor which weighs the adjustment of each bolt having consideration of the fact that its adjustment is affected by the adjustment of its neighbors,
   2. obtaining these electrical signals $a_1x_k, a_2x_k - - - a_ex_k$ for all the conversion means from $k=1$ to $k=n$ corresponding to a total of $n$ bolts,
   3. generating the electric signals $y_k$ in the range of $k = 1$ to $k = n$, that is $y_k = a_1x_{k-i} + a_2x_{k-i+1} + a_{e/2+1}x_k + - - - + a_ex_{k+i}$ by adding all effects of all said conversion means to the $k$ position of the gap in order to simulate the gap between lips at each position of each bolt,
   4. obtaining the quantity $x_k$ for each of said bolts, in the range of $k = 1$ to $k = n$ which simulates the required operational amount of adjustment of each bolt through adjusting these electric signals $y_k$ so that the said signals $y_k$ are in accordance with the desired gap distribution by controlling the values of $x_k$ using each of the said conversion means, and
   5. adjusting said bolts in accordance with the adjustment settings of said conversion means, for obtaining the desired gap spacing.

2. A method according to claim 1, which achieves a flat distribution of the gap between the die lips and a corresponding uniform thickness of the plastic sheet-like material extruded therebetween, wherein each said conversion means is operated so that the electric signals $y_k$, that is $y_k = a_1x_{k-i} + a_2x_{k-i} + - - - + a_{e/2+1}$ for simulating the gap distribution is in accordance with a measured gap distribution, by adjusting the quantities x through the range $k = 1$ to $k = n$, obtaining the desired amount of adjustment of each bolt from said $x$ values in simulation, and operating each bolt in rotation by the amount $x$ but in the reverse direction.

3. A method according to claim 1, which achieves the desired gap distribution between the die lips, wherein each of the conversion means of the said simulator is operated so that the electric signal is $y_k$, ($k=1$ to $k=n$) that is $a_1x_{k-i} + - - - + a_{e/2+1}x_k + - - - + a_ex_{k+i}$ which simulates the gap distribution at each position and is in accordance with the measured gap distribution, obtaining the index values $t_k$, through the range $k=1$ to $k=n$, that is $a_1x_{k-i} + a_2x_{k-i+1} + - - - + a_{e/2+1}x_k$ which are the values of the added effects upon the gap between the die lips at the $k$ position of the bolt due to the adjustment of the bolt $k$ itself and also to the bolts previously adjusted, by means of the simulator, and wherein each bolt is sequentially operated from bolt 1 to bolt $n$ until the gap between die lips at the position of the said bolt is in accordance with said values of $t_k$ through the range $k=1$ to $k=n$.

4. A method according to claim 1, which achieves a flat gap distribution between the die lips and a uniform thickness of the plastic sheet-like material extruded therethrough, wherein each of the conversion means of the said simulator is operated so that the electric signals $y_k$, in the range of $k=1$ to $k=n$, that is in the series $a_1x_{k-i} + a_2x_{k-i+1} + - - - + a_{e/2+1}x_k + - - - + a_ex_{k+i}$ are in accordance with the measured gap distribution and the measured thickness distribution of the plastic sheet-like material, obtaining index values $z_k$ through the series $a_{e/2+1}x_{k+1} + - - - + a_ex_{k+i}$ which are values which add the effects due to the bolts to be operated after the bolt $k$ upon the gap between die lips at the position of bolt $k$ by means of the simulator, and each bolt is rotatably adjusted sequentially until the gap between the lips and the thickness of the plastic sheet-like material extruded therethrough at the position of the said bolt $k$ is in accordance with $z_k$ through the range $k=1$ to $k=n$.

5. A method according to claim 1, wherein the said bolt is rotated in accordance with the necessary amount of exclusive rotation of the dead zone of the bolts.

6. A method according to claim 5, wherein the said dead zone of the bolt is detected by the revolution torque of the bolts.

* * * * *